(12) United States Patent
Chillar et al.

(10) Patent No.: US 8,100,632 B2
(45) Date of Patent: Jan. 24, 2012

(54) COOLING SYSTEM FOR A TURBOMACHINE

(75) Inventors: Rahul J. Chillar, Marietta, GA (US);
Raub W. Smith, Ballston Lake, NY (US)

(73) Assignee: General Electric Company, Schenectady, NY (US)

(*) Notice: Subject to any disclaimer, the term of this patent is extended or adjusted under 35 U.S.C. 154(b) by 611 days.

(21) Appl. No.: 12/327,356

(22) Filed: Dec. 3, 2008

(65) Prior Publication Data

US 2010/0135776 A1 Jun. 3, 2010

(51) Int. Cl.
*F01D 25/26* (2006.01)
(52) U.S. Cl. ......... 415/108; 415/114; 415/175; 415/176
(58) Field of Classification Search .................. 415/108, 415/114, 175, 176
See application file for complete search history.

(56) References Cited

U.S. PATENT DOCUMENTS

| | | | | |
|---|---|---|---|---|
| 5,593,274 A | * | 1/1997 | Carreno et al. | 415/115 |
| 5,829,245 A | * | 11/1998 | McQuiggan et al. | 60/806 |
| 6,398,486 B1 | * | 6/2002 | Storey et al. | 415/115 |
| 6,638,013 B2 | * | 10/2003 | Nguyen et al. | 415/115 |

* cited by examiner

*Primary Examiner* — Michelle Mandala
(74) *Attorney, Agent, or Firm* — Dale J. Davis; Ernest G. Cusick; Frank A. Landgraff

(57) ABSTRACT

An embodiment of the present invention may provide an integrated cooling system for multiple compartments of a turbomachine. The cooling system, in accordance with embodiments of the present invention, may provide the following benefits to the user. Improvement on the combined cycle efficiency and an increase in the power output. This may result from reducing the exhaust dilution losses and reducing the parasitic load by requiring fewer air circulation devices. The present invention may also benefit the user by reducing the installation and start-up costs of the cooling system by requiring fewer air circulation devices and integrating the cooling systems. The present invention may circulate a cooling fluid through an integrated cooling circuit, which may be in fluid communication with each compartment of the multiple compartment of the turbomachine.

17 Claims, 3 Drawing Sheets

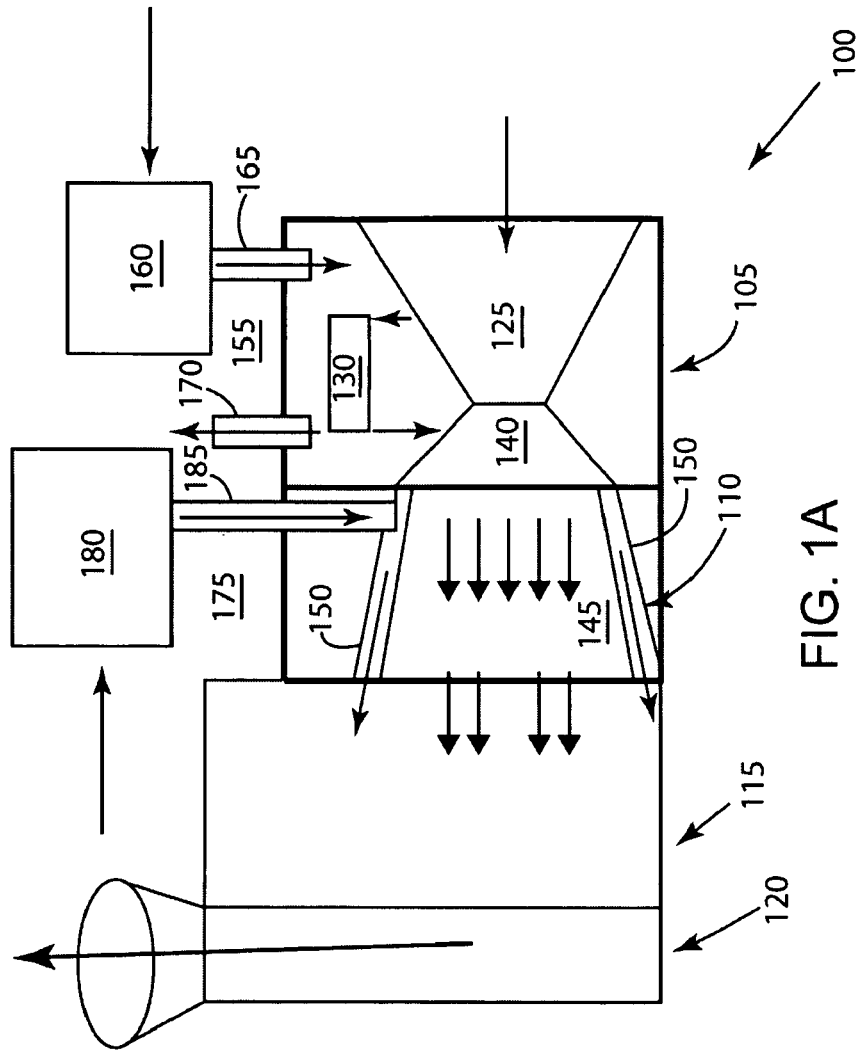
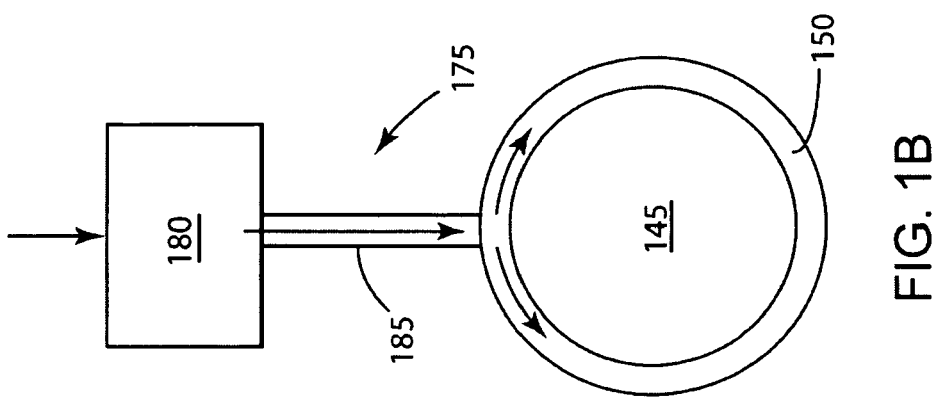
FIG. 1A
FIG. 1B

COOLING SYSTEM FOR A TURBOMACHINE

BACKGROUND OF THE INVENTION

The present invention relates generally to a cooling system for a turbomachine; more specifically, but not by way of limitation, to an integrated cooling system that requires less energy to operate.

Generally, many components and/or systems of a powerplant require cooling. FIGS. 1A and 1B, collectively FIG. 1, is a schematic illustrating known independent cooling systems for a turbomachine. FIG. 1 illustrates a turbomachine 100, a heat recovery steam generator (HRSG) 115, and a stack 120.

Generally, the turbomachine 100 may comprise multiple compartments, which enclose the components of the turbomachine 100. FIG. 1 illustrates two of the multiple compartments: a first compartment 105 and a second compartment 110. Although the present invention is described with repeated references to the first compartment 105 and the second compartment 110, the present invention is not limited to the first compartment 105 and second compartment 10. Furthermore, an embodiment of the present invention may be adapted to each of the multiple compartments, some of which may not be illustrated in the Figures.

The first compartment 105 may enclose a compressor section 125 which drawings in ambient air, illustrates by an arrow. The ambient air enters the compressor section 125, is compressed and then discharged to a combustion system 130, where a fuel, such as a natural gas, is burned to provide high-energy combustion gases; which drives a turbine section 140. In the turbine section 140, the energy of the combustion gases is converted into work, some of which is used to drive the compressor section 125, with the remainder available to drive a load such as, but not limiting of, a generator (not illustrated). While the turbomachine 100 operates, these components emit heat that raises the temperature of the environment enclosed by the first compartment 105.

The first compartment 105 may also include a first compartment (FC) cooling circuit 155, which serves to lower the temperature of the environment within the first compartment 105. An embodiment of the FC cooling circuit 155 may comprise a FC air circulation device 160, a FC supply line 165, and a FC discharge line 170. An embodiment of the FC air circulation device 160 may comprise at least one fan. The FC cooling circuit 155 may draw in air that derives from the ambient. For example, but not limiting of, the air may flow directly from the ambient; or the air may flow from a ducting system that conditions the air, which originates from the ambient.

Next, the FC cooling circuit 155 may move the ambient air through the FC supply line 165 into the first compartment 105. Here, the ambient air becomes heated, as some of the heat from the first compartment 105 is removed. Then, the heated air is discharged to the atmosphere via the FC discharge line 170.

For example, but not limiting of, the FC cooling circuit 155 draws in ambient air, removes heat from the first compartment 105. This heated air may then be discharged to atmosphere at 200 degrees Fahrenheit or greater.

The second compartment 110 may enclose an exhaust frame 145, which generally serves to move the exhaust generated by the turbomachine 100 towards an HRSG 115. Here, the exhaust frame 145 channels the exhaust that flows from the turbine section 140 to the HRSG 115 via a shell. An embodiment of the shell comprises a double wall 150. The double wall 150 may comprise a circular annulus that surrounds the exhaust frame 145, as illustrated in FIG. 1B. An alternate embodiment of the shell may comprise a single shell, wherein the single wall may comprise cooling holes and/or a serpentine cooling path for cooling the exhaust frame 145.

The second compartment 110 may also include a second compartment (SC) cooling circuit 175, which serves to lower the temperature of the environment within the second compartment 110. An embodiment of the SC cooling circuit 175 may comprise a SC air circulation device 180, and a SC supply line 185. An embodiment of the SC air circulation device 180 may comprise at least one blower. The SC cooling circuit 175 may draw in ambient air, then move the ambient air through the SC supply line 185 into the double wall 150. Here, the ambient air serves to cool the exhaust frame 145, which is heated by the exhaust flowing therein. The ambient air becomes heated and is discharged to the HRSG 115 where the heated air mixes with the exhaust.

For example, but not limiting of, the SC cooling circuit 175 draws in ambient air which may become heated to 350 degrees Fahrenheit or greater. This heated air is then mixed with the exhaust that may be at a temperature of 1150 degrees Fahrenheit or greater.

There may be a few concerns with the current cooling systems. The FC air circulation device 160 and the SC air circulation device 180 typically require electricity to operate. The devices 160,180 may be considered parasitic loads on the turbomachine 100. Generally, parasitic loads consume a portion of the energy generate by the turbomachine leading to a reduction in the overall efficiency.

Also, temperature dilution occurs when relatively cooler air discharging from the double wall 150 mixes with the significantly hotter exhaust discharging from the internal portions of the exhaust frame 145. Temperature dilution may be considered an irreversible energy loss, which leads to less energy available for the bottoming cycle of the HRSG 115. This temperature dilution may cause an approximately 10 to 20 degree temperature suppression, leading to a decrease in the efficiency of the turbomachine 100 and the HRSG 115.

For the foregoing reasons, there is a need for an integrated turbomachine cooling system. The system should integrate the cooling of multiple turbomachine compartments. The system should also reduce the amount of parasitic loads on the turbomachine. The system should also decrease the effect of temperature dilution.

BRIEF DESCRIPTION OF THE INVENTION

In accordance with an embodiment of the present invention, a system for cooling multiple compartments of a turbomachine, the system comprising: a turbomachine comprising multiple compartments, wherein the compartments comprise at least a first compartment and a second compartment; a cooling system for reducing a temperature of each compartment of the multiple compartments; wherein the cooling system comprises: a cooling circuit which is in fluid communication with at least the first compartment and the second compartment; wherein a first portion the cooling circuit is located within the first compartment and a second portion of the cooling circuit is located within the second compartment; at least one air circulation device for moving a cooling fluid through the cooling circuit; wherein the cooling fluid comprises air which derives from ambient, wherein an air enters the first compartment at a first temperature range, exits the first compartment at a second temperature range and then enters the second compartment at the second temperature range and exits the second compartment at a third temperature range.

BRIEF DESCRIPTION OF THE DRAWINGS

These and other features, aspects, and advantages of the present invention will become better understood when the following detailed description is read with reference to the accompanying drawings in which like characters represent like elements throughout the drawings.

FIGS. 1A and 1B, collectively FIG. 1, is a schematic illustrating known independent cooling systems for a turbomachine.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper," "lower," "left," "right," "front", "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

Cooling systems, in accordance with embodiments of the present invention, may provide the following benefits to the user. Improvement on the combined cycle efficiency and an increase in the power output. This may result from reducing the exhaust dilution losses and reducing the parasitic load by requiring fewer air circulation devices. The present invention may also benefit the user by reducing the installation and start-up costs of the cooling system by requiring fewer air circulation devices and integrating the cooling systems. The present invention may circulate a cooling fluid through an integrated cooling circuit, which may be in fluid communication with each compartment of the multiple compartment of the turbomachine 100.

Figure 2:
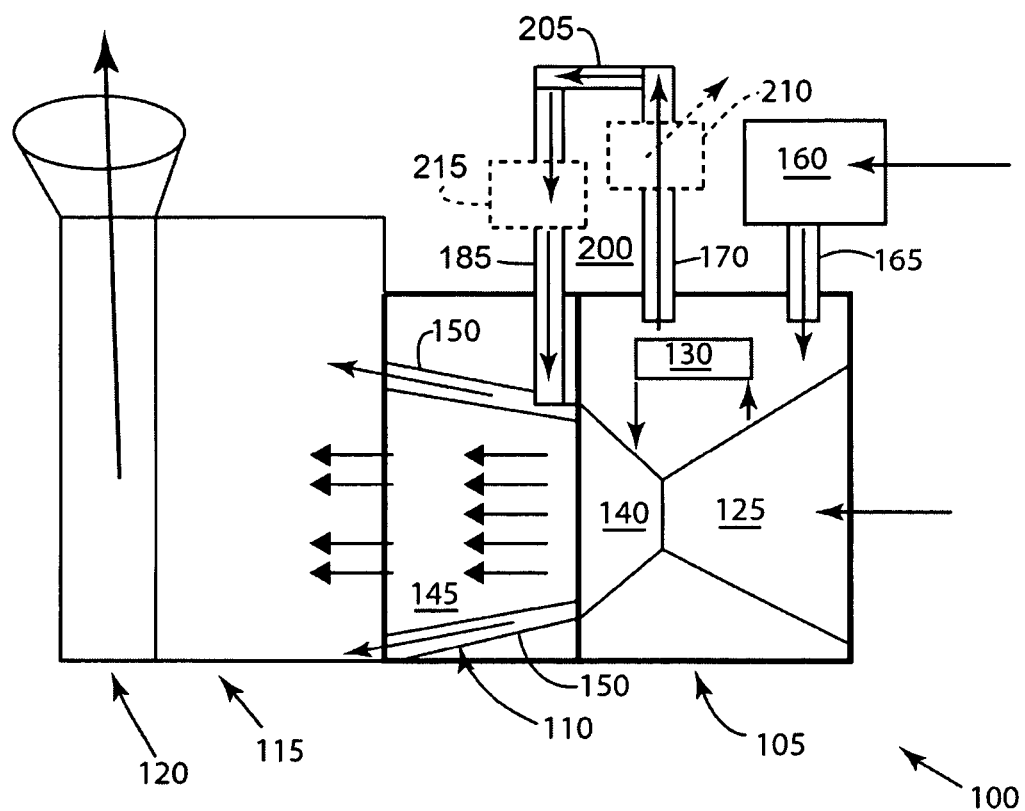
FIG. 2 is a schematic illustrating an integrated cooling system for a turbomachine, in accordance with an embodiment of the present invention.
Figure 3:
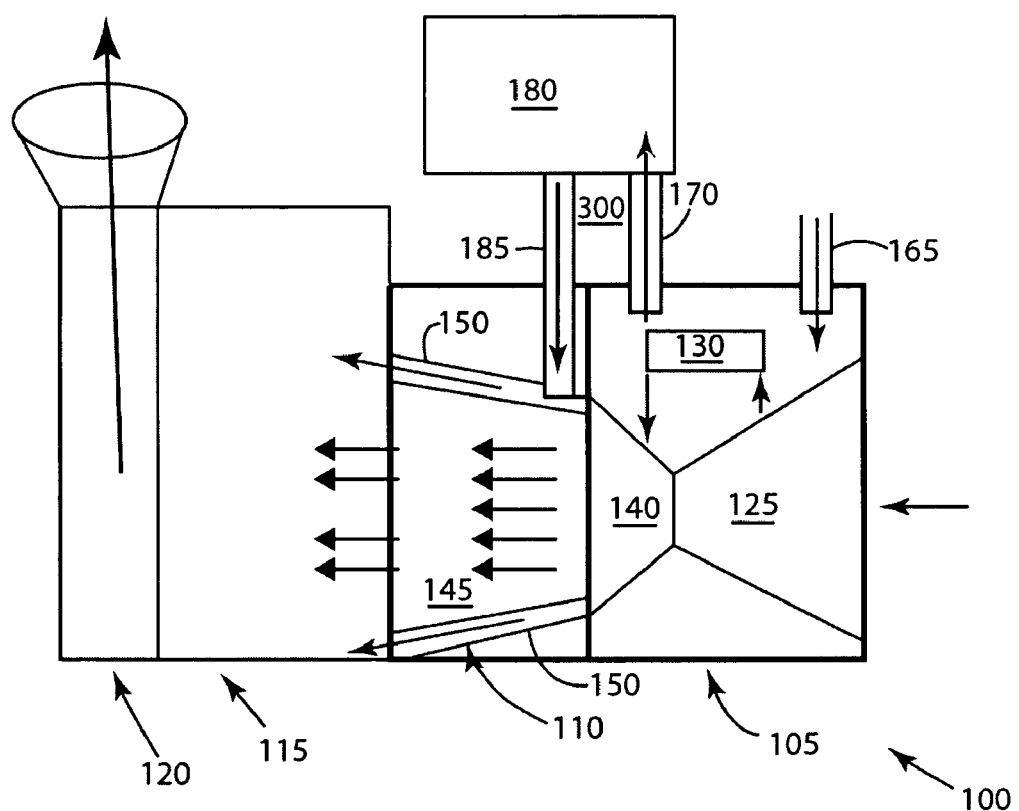
FIG. 3 is a schematic illustrating an integrated cooling system for a turbomachine, in accordance with an alternate embodiment of the present invention.

Referring again to the Figures, where the various numbers represent like elements throughout the several views, FIGS. 2 and 3 are schematic illustrating integrated cooling systems. The discussions of FIGS. 2 and 3 will be limited to the respective inventions; other illustrated elements may be similar to the discussion of FIG. 1.

FIG. 2 is a schematic illustrating an integrated cooling system for a turbomachine 100, in accordance with an embodiment of the present invention. This embodiment of the present invention may utilize a first integrated cooling circuit 200 to cool the first compartment 105 and the second compartment 110. An embodiment of the first integrated cooling circuit 200 may comprise: the FC air circulation device 160, the FC supply line 165, the FC discharge line 170, the SC supply line 185, and a compartment link 205.

An embodiment of the first integrated cooling circuit 200 serves to integrate the FC cooling circuit 155 and the SC cooling circuit 175 into one circuit. This may provide a more efficient and simultaneous cooling of the first compartment 105 and the second compartment 110. The cooling compartment link 205 allows for the discharge of the heated air to serves as a cooling fluid for the exhaust frame 145. This may be accomplished by, for example, but not limiting of, connecting a discharge end of the FC discharge line 170 with a first end of the cooling compartment link 205. Next a second end of the cooling compartment link 205 may be connected to a supply end of the SC supply line 185.

In use, an embodiment of the first integrated cooling circuit 200 may operate as follows. The FC air circulation device 160 may draw-in air from the ambient. This ambient air may be pressurized and discharged via the FC supply line 165 into the first compartment 105. The warm air may then exit the first compartment 105, via the FC discharge line 170, and flow through the cooling compartment link 205 to the SC supply line 185. The warm air may then flow through the double wall 150 to cooling the exhaust frame 145. Here, the air is heated again and exits the exhaust frame 145 to mix with the exhaust.

For example, but not limiting of, the FC air circulation device 160 may drawn in air from the ambient. The air may enter the first compartment 105 at a temperature of approximately 90 degrees Fahrenheit. The temperature of the air is increased as heat is removed from the first compartment 105 by the air. The air may exit the first compartment 105 at a temperature of approximately 300 degrees Fahrenheit. The air may this enter the double wall 150 at a temperature of approximately 300 degrees Fahrenheit, which is significantly highly than air at an ambient temperature. The air is heated again as the exhaust frame 145 is cooled. The air may exit the double wall 150 at a temperature of approximately 360 degrees Fahrenheit. The air may then mix with the exhaust, which may have a temperature of approximately 1200 degrees Fahrenheit. This may increase the effective exhaust temperature, which may lead to higher output and efficiency of the HRSG 115.

In a first alternate embodiment of the first integrated cooling circuit 200, the FC air circulation device 160 may be integrated on the FC discharge line 170. Here, the FC air circulation device 160 may induce the circulation of the air within the first compartment 105.

In a second alternate embodiment of the first integrated cooling circuit 200, a bypass line 210 may be integrated therein. Depending on the specific design of the turbomachine 100 and/or the exhaust frame 145, the cooling flow required may be lower than the flowrate provided by the first integrated cooling circuit 200. Here, the bypass line 210 may remove a portion of the air within the first integrated cooling circuit 200. An embodiment of the bypass line 210 may vent the excess air to the atmosphere.

In a third alternate embodiment of the first integrated cooling circuit 200, a booster device 215 may be integrated therein. Depending on the required delivery pressure of the air to the exhaust frame 145, a booster device 215 may be required. The booster device 215 may be configured for increasing the pressure. The booster device 215 may comprise a blower, or the like. The size of the booster device 215 may be significantly smaller than and consume less energy than the SC air circulation device 180, previously described.

FIG. 3 is a schematic illustrating an integrated cooling system for a turbomachine, in accordance with an alternate embodiment of the present invention. This embodiment of the present invention may utilize a second integrated cooling circuit 300 to cool the first compartment 105 and the second compartment 110. An embodiment of the second integrated cooling circuit 300 may comprise: the FC supply line 165, the FC discharge line 170, the SC air circulation device 180, and the SC supply line 185.

An embodiment of the second integrated cooling circuit 300 serves to integrate the FC cooling circuit 155 and the SC cooling circuit 175 into one circuit. This may provide a more efficient and simultaneous cooling of the first compartment 105 and the second compartment 110. The SC air circulation device 180 may link the first compartment 105 and the second compartment 110. The SC air circulation device 180 may allow for the discharge of the heated air of the first compartment 105 to serve as a cooling fluid for the exhaust frame 145. This may be accomplished by, for example, but not limiting of, connecting a discharge end of the FC discharge line 170 to an inlet portion of the SC air circulation device 180. Next a discharge portion of the SC air circulation device 180 may be connected to a supply end of the SC supply line 185.

In use, an embodiment of the second integrated cooling circuit 300 may operate as follows. The SC air circulation device 180 may draw air from the ambient. The air may enter the first compartment 105 via the FC supply line 165. The warm air may then exit the first compartment 105 via the FC discharge line 170. The warm air may be pressurized by the SC air circulation device 180 and discharged, via the SC supply line 185, into the double wall 150 to cooling the exhaust frame 145. The air is heated again and exits the exhaust frame 145 to mix with the exhaust.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system for cooling multiple compartments of a turbomachine, the system comprising:
    a turbomachine comprising multiple compartments, wherein the compartments comprise at least a first compartment and a second compartment;
        wherein the first compartment encloses at least one turbomachine component,
        wherein the at least one turbomachine component comprises: a compressor
        section; a combustion section; or a turbine section;
    a cooling system for reducing a temperature of each compartment of the multiple compartments; wherein the cooling system comprises:
    a cooling circuit which is in fluid communication with at least the first compartment and the second compartment; the cooling circuit comprises a first portion the cooling circuit is located within the first compartment and a second portion of the cooling circuit is located within the second compartment;
        wherein the first portion of the cooling circuit comprises: a first compartment (FC) supply line for allowing the air to enter the first compartment; and a first compartment (FC) discharge line for allowing the air to exit the first compartment; and
        wherein the second portion of the cooling circuit comprises: a second compartment (SC) supply line; and at least one compartment link for integrating the SC supply line with a discharge end of the first portion of the cooling circuit; and
    at least one air circulation device for moving a cooling fluid through the cooling circuit;
        wherein the cooling fluid comprises air which derives from ambient;
        wherein an air enters the first compartment at a first temperature range, exits the first compartment at a second temperature range and then enters the second compartment at the second temperature range and exits the second compartment at a third temperature range.

2. The system of claim 1, wherein the second compartment encloses an exhaust frame, wherein the exhaust frame comprises a shell, and wherein the SC supply line integrates the shell.

3. The system of claim 2, wherein the shell comprises a double wall and allow for the SC supply line to discharge the air through the double wall.

4. The system of claim 3, further comprising a HRSG integrated with an aft end of the second compartment, wherein the HRSG receives an exhaust generated by the turbomachine and receives the air from a discharge portion of the cooling circuit.

5. The system of claim 4, wherein the at least one air circulation device comprises a fan and is connected to an intake end of the FC supply line.

6. The system of claim 5, wherein the fan receives air that derives from the ambient, and moves the air through: the FC supply line, the FC discharge line, the SC supply line, the at least one compartment link, and the SC discharge line wherein the air is discharged into the exhaust frame.

7. The system of claim 5, further comprising a bypass system for allowing a portion of the air to discharge from the cooling circuit.

8. The system of claim 7, wherein the bypass system is integrated with the FC discharge line.

9. The system of claim 8, wherein the bypass system comprises a vent allowing for the air to discharge to the ambient.

10. The system of claim 6, further comprising a booster device configured for increasing a flowrate of the air flowing within the cooling circuit.

11. The system of claim 10, wherein the booster device comprises at least one of: a fan, a blower, or combinations thereof.

12. The system of claim 11, wherein the booster device is integrated with SC supply line.

13. The system of claim 4, wherein the at least one air circulation device comprises a blower.

14. The system of claim 13, wherein an inlet portion of the blower is integrated with a discharge end of the FC discharge line and an outlet portion of the blower is integrated with an inlet end of the SC supply line.

15. The system of claim 14, wherein the blower draws the air through the FC supply line, the FC discharge line; and the blower moves the air through the SC discharge line and the exhaust frame.

16. The system of claim 4, wherein the cooling system discharges the air, which then engages the exhaust, and reduces a temperature of the exhaust by less than about 15 degrees Fahrenheit.

17. The system of claim 4, wherein the at least one air circulation device comprises a fan and is connected to the FC discharge line.

* * * * *